(12) United States Patent
Kobayashi

(10) Patent No.: US 9,612,731 B2
(45) Date of Patent: Apr. 4, 2017

(54) INFORMATION PROCESSING DEVICE, CONTROL METHOD FOR THE SAME AND PROGRAM

(75) Inventor: Jun Kobayashi, Kanagawa (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 13/876,469

(22) PCT Filed: Sep. 22, 2011

(86) PCT No.: PCT/JP2011/071573
§ 371 (c)(1),
(2), (4) Date: Mar. 27, 2013

(87) PCT Pub. No.: WO2012/043360
PCT Pub. Date: Apr. 5, 2012

(65) Prior Publication Data
US 2013/0181933 A1    Jul. 18, 2013

(30) Foreign Application Priority Data
Sep. 29, 2010 (JP) ................................. 2010-218464

(51) Int. Cl.
*G06F 3/041* (2006.01)
*G06F 3/0484* (2013.01)
*G06F 3/0488* (2013.01)

(52) U.S. Cl.
CPC ...... *G06F 3/04845* (2013.01); *G06F 3/04883* (2013.01); *G06F 2203/04808* (2013.01); *H04M 2250/22* (2013.01)

(58) Field of Classification Search
CPC ............... G06F 3/04883; G06F 3/0488; G06F 3/04845; G06F 2203/04808; G06F 2203/04806; H04M 2250/22
(Continued)

(56) References Cited

U.S. PATENT DOCUMENTS 7,138,983 B2 * 11/2006 Wakai et al. .................. 345/173
7,643,012 B2 *  1/2010 Kim ....................... G06F 3/0488
                                                     345/173
(Continued)

FOREIGN PATENT DOCUMENTS

CN    101198925 A    6/2008
CN    101482795 A    7/2009
(Continued)

OTHER PUBLICATIONS

JP H09-035066 A, Machii et al., machine translation (1997).*
(Continued)

*Primary Examiner* — Peter D McLoone
(74) *Attorney, Agent, or Firm* — McGinn IP Law Group, PPLC.

(57) ABSTRACT

Information processing device includes display unit that displays operation object; tactile contact detection unit that detects a plurality of push-down points; and control unit that performs first operation assessment for detecting whether or not outer peripheral distance of first area formed by connecting adjacent push-down points among a plurality of push-down points detected by tactile contact detection unit decreases over time to predetermined value or less, and that performs second operation assessment for detecting whether or not the outer peripheral distance of second area formed by connecting adjacent push-down points among a plurality of push-down points detected by tactile contact detection unit increases over time to predetermined value or more. Control unit puts operation object in selected state when there is overlapping part between operation object and first area after first operation assessment, and performs first operation corresponding to place where second operation assessment has been performed on operation object.

18 Claims, 8 Drawing Sheets

(58) Field of Classification Search
USPC ....... 345/157, 173, 174; 178/18.01; 715/863
See application file for complete search history.

(56) References Cited

U.S. PATENT DOCUMENTS

| | | | |
|---|---|---|---|
| 7,812,826 B2* | 10/2010 | Ording et al. .................. 345/173 |
| 7,877,707 B2* | 1/2011 | Westerman ......... G06F 3/04883 |
| | | | 715/863 |
| 7,936,341 B2* | 5/2011 | Weiss ................. G06F 3/04883 |
| | | | 345/173 |
| 7,986,308 B2* | 7/2011 | Wakai et al. ................... 345/173 |
| 8,531,421 B2* | 9/2013 | Wakai et al. ................... 345/173 |
| 8,681,104 B2* | 3/2014 | Westerman et al. .......... 345/173 |
| 8,756,532 B2* | 6/2014 | Poon et al. .................... 715/863 |
| 8,799,775 B2* | 8/2014 | Weeldreyer ........... G06F 17/214 |
| | | | 715/255 |
| 8,917,245 B2* | 12/2014 | Nagai ..................... G06F 3/041 |
| | | | 345/173 |
| 9,001,064 B2* | 4/2015 | Mesguich Havilio ............... G06F 3/04883 |
| | | | 345/173 |
| 2002/0036618 A1* | 3/2002 | Wakai et al. ................... 345/157 |
| 2006/0026535 A1* | 2/2006 | Hotelling .............. G06F 3/0418 |
| | | | 715/863 |
| 2007/0097093 A1* | 5/2007 | Ohshita ................ G06F 3/0485 |
| | | | 345/173 |
| 2007/0103452 A1* | 5/2007 | Wakai et al. ................... 345/173 |
| 2007/0120833 A1 | 5/2007 | Yamaguchi et al. |
| 2007/0152984 A1* | 7/2007 | Ording et al. .................. 345/173 |
| 2007/0229471 A1 | 10/2007 | Kim et al. |
| 2008/0168403 A1 | 7/2008 | Westerman et al. |
| 2008/0231610 A1* | 9/2008 | Hotelling .............. G06F 3/0418 |
| | | | 345/173 |
| 2008/0297482 A1 | 12/2008 | Weiss |
| 2008/0309632 A1* | 12/2008 | Westerman et al. .......... 345/173 |
| 2009/0189877 A1* | 7/2009 | Washino et al. .............. 345/174 |
| 2009/0289911 A1 | 11/2009 | Nagai |
| 2009/0327975 A1 | 12/2009 | Stedman |
| 2010/0090971 A1 | 4/2010 | Choi et al. |
| 2010/0194701 A1* | 8/2010 | Hill ........................... G06F 1/00 |
| | | | 345/173 |
| 2010/0313125 A1* | 12/2010 | Fleizach ............. G06F 3/04883 |
| | | | 715/702 |
| 2011/0043527 A1* | 2/2011 | Ording et al. ................. 345/428 |
| 2011/0077851 A1* | 3/2011 | Ogawa et al. ................. 701/200 |
| 2011/0078560 A1* | 3/2011 | Weeldreyer et al. ......... 715/255 |
| 2011/0175822 A1* | 7/2011 | Poon et al. .................... 345/173 |
| 2011/0279396 A1* | 11/2011 | Wakai et al. ................... 345/173 |
| 2011/0285649 A1* | 11/2011 | Ogawa .................. G06F 3/0485 |
| | | | 345/173 |
| 2012/0169670 A1* | 7/2012 | Kim ........................ G06F 3/017 |
| | | | 345/175 |
| 2014/0168095 A1* | 6/2014 | Mesguich Havilio ........ 345/173 |

FOREIGN PATENT DOCUMENTS

| | | |
|---|---|---|
| JP | 9-035066 A | 2/1997 |
| JP | 11-073271 A | 3/1999 |
| JP | 2001-265475 A | 9/2001 |
| JP | 2001-356878 A | 12/2001 |
| JP | 2007-128497 A | 5/2007 |
| JP | 2007-272904 A | 10/2007 |
| JP | 2008-508601 A | 3/2008 |
| JP | 2009-282634 A | 12/2009 |
| WO | WO 2009/060454 A2 | 5/2009 |
| WO | WO 2010/044576 A2 | 4/2010 |
| WO | WO 2010/062348 A2 | 6/2010 |

OTHER PUBLICATIONS

JP 2001-356878 A, Urano et al., machine translation.*
International Search Report in PCT/JP2011/071573 dated Oct. 25, 2011 (English Translation Thereof).
Yoko Ishii, et al.: "EnhancedMovie: Movie Editing on an Augmented Desk", Proceedings the Fifth International Conference on Ubiquitous Computing (UbiComp 2003), Oct. 15, 2003, pp. 153-154, XP055137186, URL: http://www.hci.iis.u-tokyo.ac.jpj-ysat ojpapersjlshii-Ubicomp03.pdf.
Julien Epps, et al: "A Study of Hand Shape Use in Tabletop Gesture Interaction", CHI '06 Extended Abstracts on Human Factors in Computing Systems, CHI EA '06, Jan. 1, 2006, p. 748, XP055136972, New York, New York, USA.
Chris North, et al: "Understanding Multi-touch Manipulation for Surface Computing", Aug. 24, 2009, Human-Computer Interaction A Interact 2009, Springer Berlin Heidelberg, Berlin, Heidelberg, pp. 236-249,XP019126306.
European Search Report dated Sep. 4, 2014.
Chinese Office Action dated Jun. 3, 2015 with an English translation thereof.
Japanese Office Action dated Jul. 21, 2015 with English translation.
Chinese Office Action (and Search Report) dated Jan. 21, 2016 with partial English translation.

* cited by examiner

"Related Art"

INFORMATION PROCESSING DEVICE, CONTROL METHOD FOR THE SAME AND PROGRAM

CROSS-REFERENCE TO RELATED APPLICATIONS

This application is based upon and claims the benefit of the priority of Japanese patent application No. 2010-218464 filed on Sep. 29, 2010, the disclosure of which is incorporated herein in its entirety by reference thereto.

TECHNICAL FIELD

The present invention relates to an information processing device, control method for the same, and program, and particularly to an information processing device comprising a detection device capable of detecting a plurality of push-down points.

BACKGROUND

Users perform many operations on an information processing device such as a mobile telephone and portable game device using a touch panel, in addition to operation keys attached to the main body. In particular, many recent information processing devices have a high-definition display screen, and such an information processing device makes intuitive operations possible by combining icons and touch panel operations. An example of an information processing device having such a user interface is shown in FIG. 2. An operation is performed on the information processing device shown in FIG. 2 by using a touch panel and operation keys provided thereunder.

Patent Literature 1 discloses a technology in which a user performs an operation using two fingers on a touch panel to select icons.
[PTL 1]
Japanese Patent Kokai Publication No. JP2001-356878A

SUMMARY

The disclosure of Patent Literature 1 listed above is incorporated herein in its entirety by reference thereto. The following analysis is given from the standpoint of the present invention.

As described above, touch panel operations are quite user-friendly and can be performed intuitively, however, it is not easy to move around icons representing files and folders stored in an information processing device by operating a touch panel, compared to normal operations such as starting a program. While a program can be started by simply double-clicking on the icon representing a particular program, more complex operations are required when, after selecting an icon, a user wishes to perform an operation on the selected icon such as moving it.

Examples of methods for moving an icon by means of touch operations include a method in which the user puts the information processing device into an icon move mode by pressing and holding (long pressing) the icon he wants to move for a predetermined period of time and then cancels the icon move mode at a location where he wants to move the icon. In this case, a two-stage operation is required: long pressing the icon to put the device into the icon move mode and then moving the icon.

Further, another method for moving an icon is to have the information processing device display a submenu, select an operation called "Cut" from the submenu, and select the icon to be moved. Then the user has the submenu displayed again at the location where he wants to move the icon and selects an operation called "Paste."

Both of these methods are problematic in terms of intuitiveness and user-friendliness, which are the benefits of touch panel operations. Further, in a case where the user wants to move a plurality of icons, he is required to select these icons one by one to move them, and this is far from an easy operation using a touch panel.

Further, the technology disclosed in Patent Literature 1 has a clarity problem in terms of icon selection since the user is able to select only icons within a rectangular area formed by two fingers when a plurality of icons are selected.

As described, the prior arts have problems to be solved.

In an aspect of the present invention, an information processing device, control method for the same, and program capable of operating icons using an intuitive method are desired.

According to a first aspect, there is provided an information processing device comprising a display unit that displays an operation object; a tactile contact detection unit that detects a plurality of push-down points; and a control unit that performs a first operation assessment for detecting whether or not an outer peripheral distance of a first area formed by connecting adjacent push-down points among a plurality of push-down points detected by the tactile contact detection unit decreases over time to a predetermined value or less, and that performs a second operation assessment for detecting whether or not an outer peripheral distance of a second area formed by connecting adjacent push-down points among a plurality of push-down points detected by the tactile contact detection unit increases over time to a predetermined value or more, wherein the control unit puts the operation object in a selected state when there is an overlapping part between the operation object and the first area after the first operation assessment and performs a first operation corresponding to a place where the second operation assessment has been performed on the operation object.

According to a second aspect, there is provided a control method for an information processing device comprising a display unit that displays an operation object and a tactile contact detection unit that detects a plurality of push-down points, and the control method includes performing a first operation assessment that detects whether or not an outer peripheral distance of a first area formed by connecting adjacent push-down points among a plurality of push-down points detected by the tactile contact detection unit decreases over time to a predetermined value or less; selecting the operation object when there is an overlapping part between the operation object and the first area; performing a second operation assessment that detects whether or not an outer peripheral distance of a second area formed by connecting adjacent push-down points among a plurality of push-down points detected by the tactile contact detection unit increases over time to a predetermined value or more; and performing a first operation corresponding to a place where the second operation assessment has been performed on the operation object. The present method is tied to a particular machine, which is an information processing device comprising a display unit that displays an operation object and a tactile contact detection unit capable of detecting a plurality of push-down points.

According to a third aspect, there is provided a program executed by a computer that constitutes an information processing device comprising a display unit that displays an operation object and a tactile contact detection unit that detects a plurality of push-down points, and the program has the computer execute a first operation assessment process of detecting whether or not an outer peripheral distance of a first area formed by connecting adjacent push-down points among a plurality of push-down points detected by the tactile contact detection unit decreases over time to a predetermined value or less; a process of selecting the operation object when there is an overlapping part between the operation object and the first area; a second operation assessment process of detecting whether or not an outer peripheral distance of a second area formed by connecting adjacent push-down points among a plurality of push-down points detected by the tactile contact detection unit increases over time to a predetermined value or more; and a process of performing a first operation corresponding to a place where the second operation assessment process has been performed on the operation object. Further, this program may be stored in a computer-readable storage medium. In other words, the present invention can be realized as a computer program product. The storage medium may be non-transient.

ADVANTAGEOUS EFFECTS OF INVENTION

According to each aspect of the present invention, there are provided an information processing device, control method for the same, and program in which icons can be operated using an intuitive method.

MODES

Figure 1:
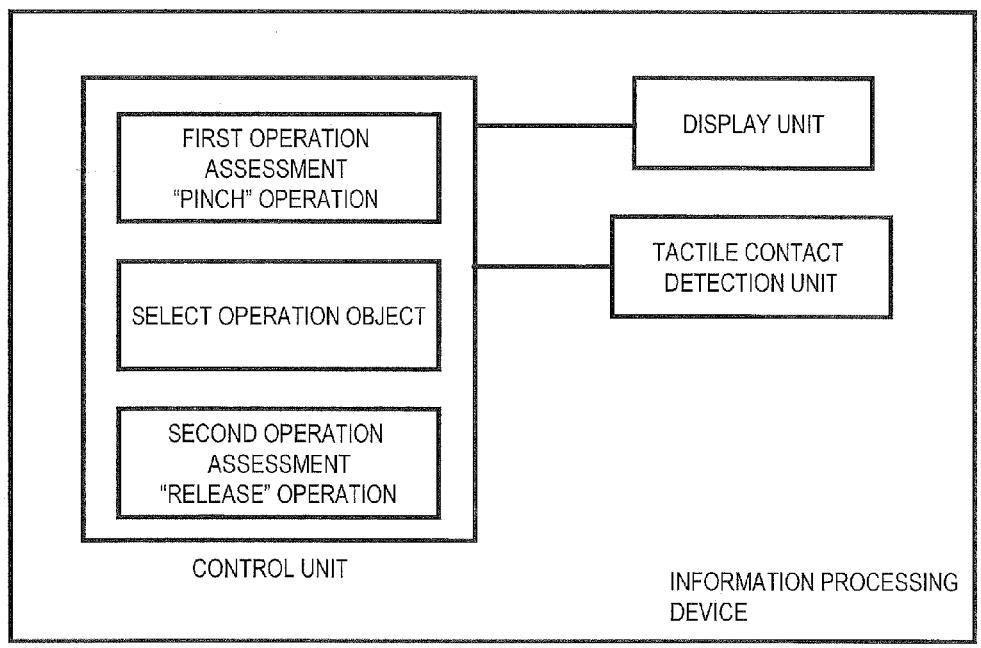
FIG. 1 is a drawing for explaining an overview of the present invention.
Figure 2:
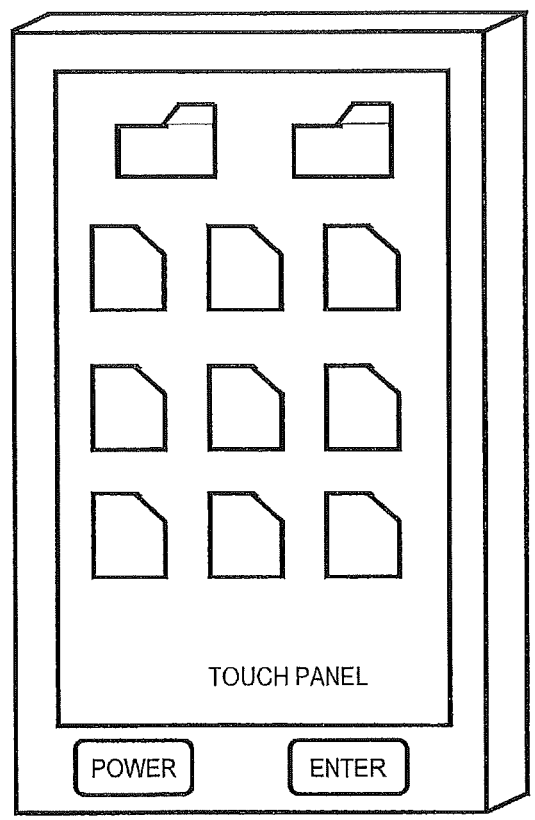
FIG. 2 is an example of an information processing device having a touch panel user interface.

First, an outline of an exemplary embodiment of the present invention is given using FIG. 1. Note that the drawing reference signs used in the summary are given solely to facilitate understanding and not to limit the present invention to the illustrated aspects.

As described, in an information processing device comprising a touch panel, more complex operations are required when a user selects an icon and then performs any operation on the selected icon, compared to normal operations.

An information processing device comprising a tactile contact detection unit that detects a plurality of push-down points and a display unit that displays an object to be operated when the user operates the information processing device assesses an operation in which the user tries to pinch an object by detecting whether or not, among the plurality of push-down points detected by the tactile contact detection unit, an outer peripheral distance of a first area formed by connecting adjacent push-down points decreases over time to a predetermined value or less (a first operation assessment).

Here, when there is an icon within the first area, this icon is treated as an operation object in a selected state. While this selected state is maintained, whether or not the user has tried to release the object is determined by detecting whether or not, among the plurality of push-down points detected by the tactile contact detection unit, an outer peripheral distance of a second area formed by connecting adjacent push-down points increases over time to a predetermined value or more (a second operation assessment). Then, depending on the location where the second operation assessment is performed, a first operation is performed on an icon that is a selection target.

As described, the information processing device comprising an intuitive and user-friendly interface is provided by operating an icon while having the tactile contact detection unit detect a plurality of push-down points and combining the first and the second operation assessments.

[First Exemplary Embodiment]

Figure 3:
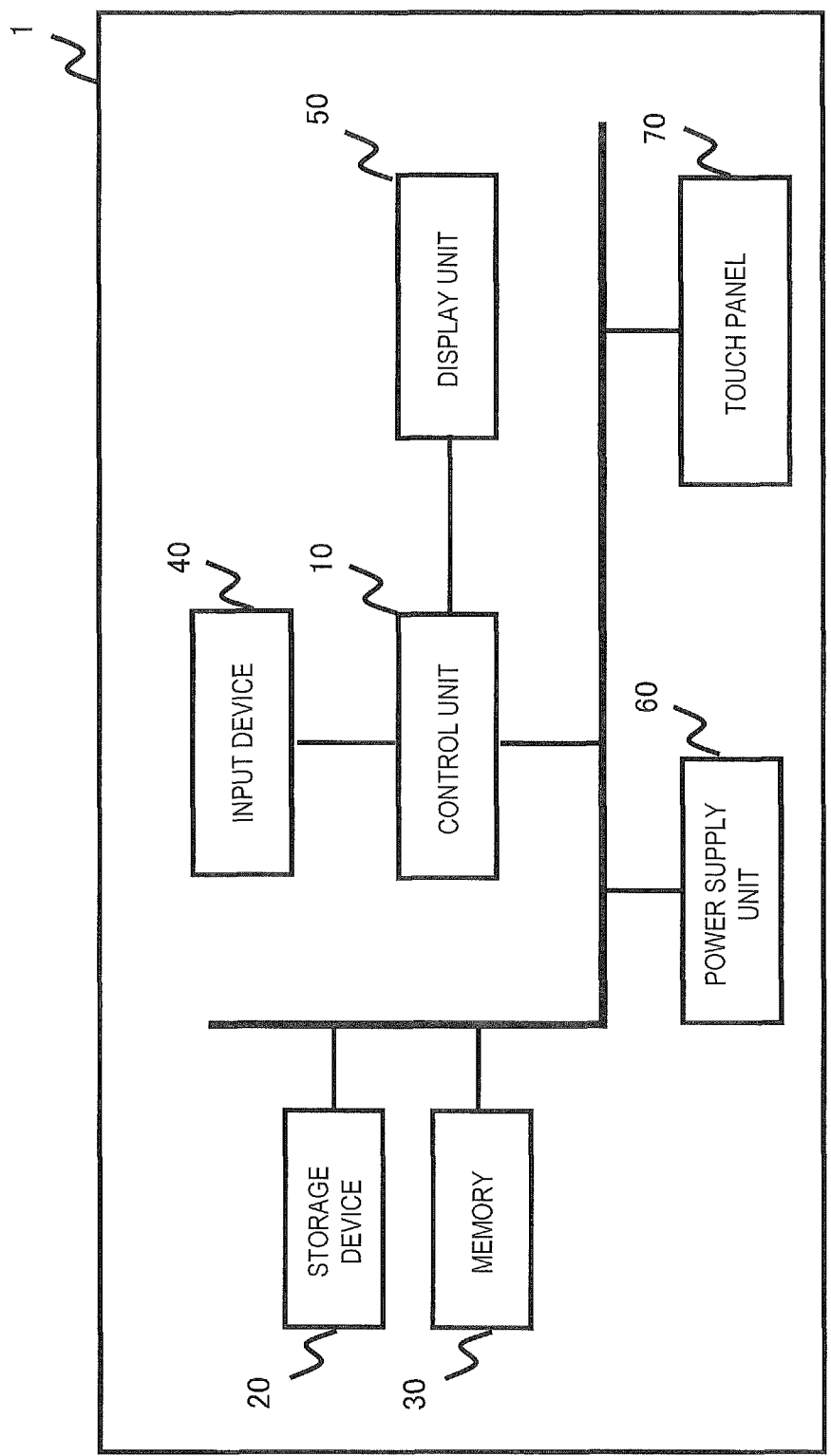
FIG. 3 is a block diagram illustrating an internal configuration of an information processing device relating to a first exemplary embodiment of the present invention.

Next, a first exemplary embodiment will be described in detail using FIG. 3. FIG. 3 is a block diagram illustrating an internal configuration of an information processing device 1 relating to the present exemplary embodiment. The information processing device 1 shown in FIG. 3 is constituted by a control unit 10, a storage device 20, a memory 30, an input device 40, a display unit 50, a power supply unit 60, and a touch panel 70.

The control unit 10 controls the entire information processing device 1, receiving a user operation from the input device 40, the display unit 50, and the touch panel 70, and responding to the operation.

The storage device 20 stores a program executed by a CPU (Central Processing Unit) included in the control unit 10. Further, the storage device also stores a text file and image data created by the user.

The memory 30 is a main storage device used when the control unit 10 executes a program.

The input device 40 is a hardware key such as a power button.

The display unit 50 provides an interface with the user and displays operation objects such as an icon and operation menu.

The power supply unit 60 provides power to each component of the information processing device 1.

The touch panel 70 corresponds to the tactile contact detection unit described above and detects positions where the user pushes down his fingers, being used together with the display unit. A screen capable of detecting two or more push-down points such as a multi-touch screen is used as the touch panel 70.

Figure 4:
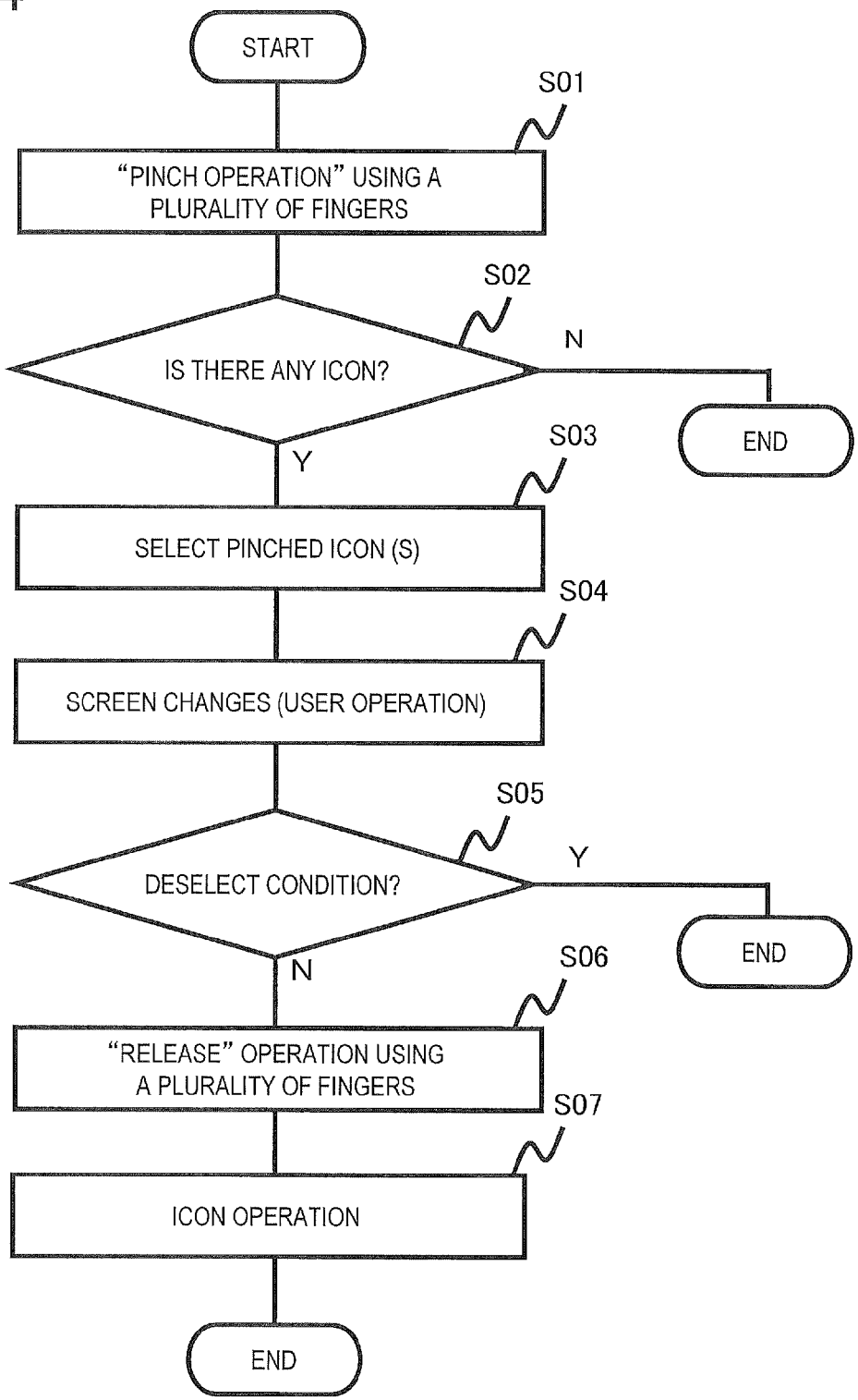
FIG. 4 is a flowchart in a case where the information processing device is operated by detecting a plurality of push-down points.

Next, an operation using the touch panel 70 in the information processing device 1 having the configuration shown in FIG. 3 will be described. FIG. 4 is a flowchart when the information processing device 1 is operated using the touch panel 70. It is assumed that the user operation is to move an icon in a folder on the information processing device 1 to another folder.

Figure 5:
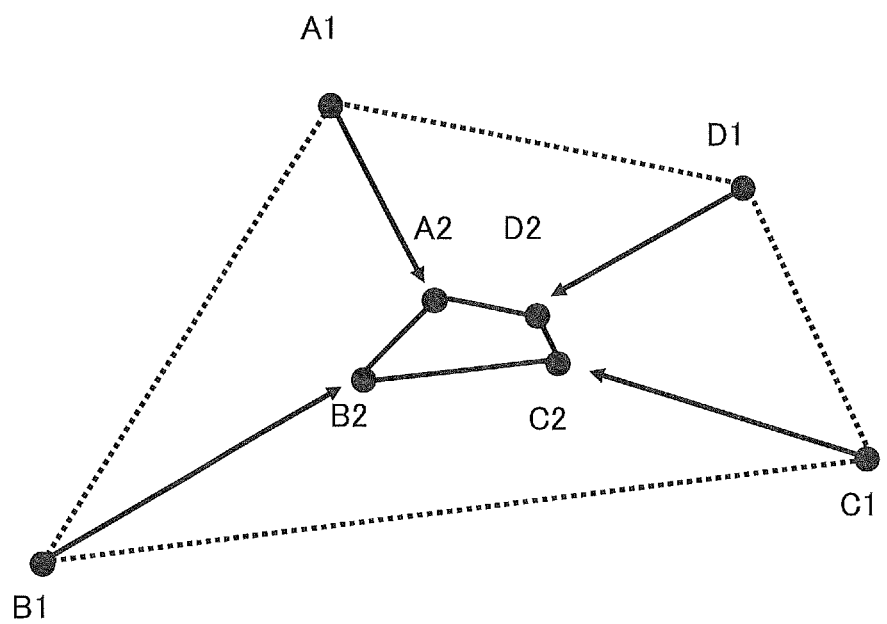
FIG. 5 is a drawing for explaining a pinch operation in FIG. 4.

In step S01, the first operation assessment is performed. For instance, let us assume that the user simultaneously pushes four areas on the touch panel 70 of the information processing device 1 and then gradually brings his four fingers together towards the center of the palm. FIG. 5 shows push-down points detected by the touch panel 70 when such an operation is performed. When the user performs the operation described, each of the push-down points A1 to D1 is detected on the touch panel 70. Then, when the user moves his four fingers and brings them together towards the center, each of the push-down points A2 to D2 is detected. Hereinafter, such an operation by the user is referred to as "pinch operation."

In the step S01, a pinch operation is detected. More concretely, the control unit 10 detects a plurality of push-down points in the touch panel 70 and detects whether or not the outer peripheral distance of an area formed by the plurality of push-down points decreases over time to a predetermined value or less. As shown in FIG. 5, when the touch panel 70 detects that the four points A1 to D1 have been pushed down, the outer peripheral distance of an area formed by the four points is calculated while always detecting (polling) the four push-down points. Then, whether or not the outer peripheral distance of the area formed by the four points is a predetermined value or less is detected. In the example of FIG. 5, when an outer peripheral distance of an area formed by the push-down points A2 to D2 reaches the predetermined value or less, the detection processing in the present step is ended.

As described, a pinch operation is detected by calculating the outer peripheral distance of a polygon formed by connecting adjacent push-down points when the number of push-down points is three or more, and by calculating a distance between two detected points when two push-down points are detected.

Step S02 confirms whether or not an icon has been selected by a pinch operation in the step S01. When no icon exists within the area formed by the first push-down points A1 to D1 in the pinch operation, the processing is ended because no selection target exists. When there is an icon, the processing proceeds to step S03.

Figure 6:
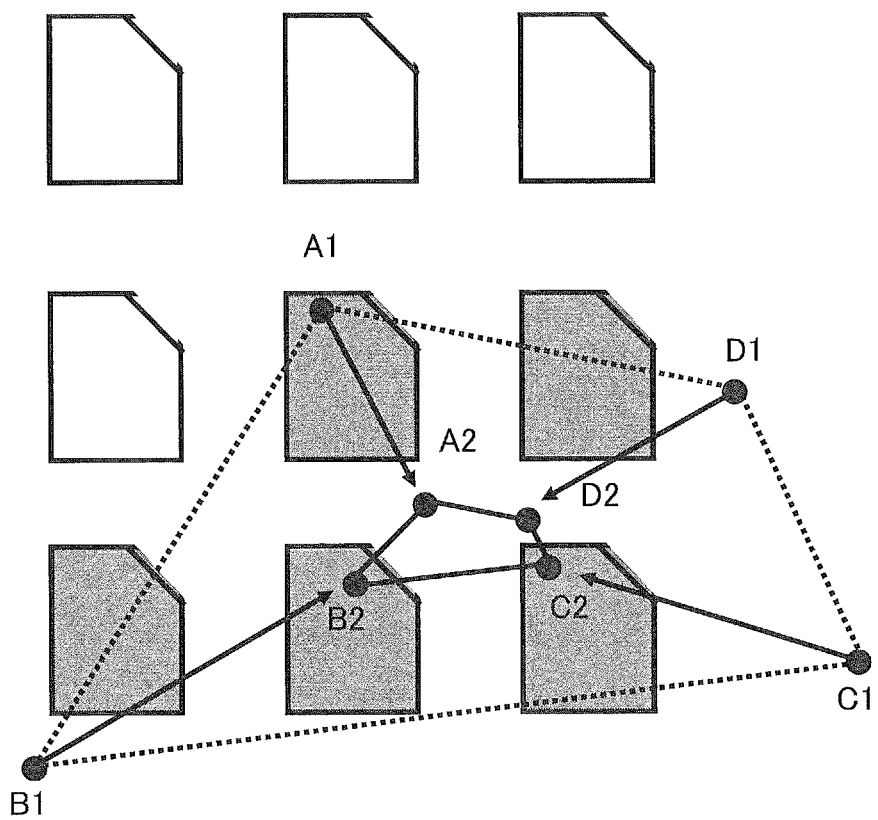
FIG. 6 is a drawing when a plurality of icons are selection targets in FIG. 4.

Since the processing proceeds to the step S03 only when one icon or more exists within the area formed by the first push-down points A1 to D1, this icon (s) is selected. In an example shown in FIG. 6, the gray icons are selected. At this time, the color of the selected icons is changed on the display unit 50 so that the selected icons can be distinguished from unselected icons. It is preferable that the color be changed so that the selected icons seem to be virtually lifted up.

In step S04, processing performed by the user on the selected icons is received. The control unit 10 moves the screen according to a user instruction performed through the input device 40 or the touch panel 70. In the operation of the present step, the information processing device 1 moves to a destination folder.

Step S05 detects whether or not the icons selected by the pinch operation should be deselected. For instance, when the information processing device 1 is powered off, the icons are deselected and the power supply unit 60 is set to a power save mode.

Figure 7:
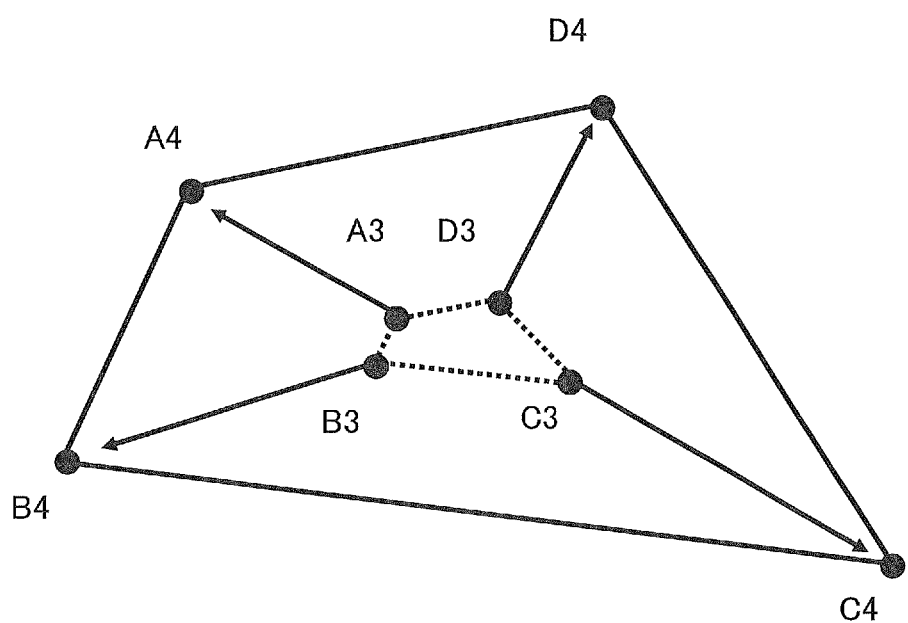
FIG. 7 is a drawing for explaining a release operation in FIG. 4.

In step S06, the second operation assessment is performed. The second operation assessment determines that an operation reverse to the first operation assessment has been performed. For instance, let us assume that the user simultaneously pushes four areas on the touch panel 70 of the information processing device 1 and then gradually spreads his four fingers outward from the center of the palm. FIG. 7 shows push-down points detected by the touch panel 70 when such an operation is performed. When the user performs the operation described, each of the push-down points A3 to D3 is detected on the touch panel 70. Then, when the user spreads out his four fingers, each of the push-down points A4 to D4 is detected. Hereinafter, such an operation by the user is referred to as "release operation."

In the step S06, a release operation is detected. More concretely, the control unit 10 detects a plurality of push-down points in the touch panel 70 and detects whether or not the outer peripheral distance of an area formed by the plurality of push-down points increases over time to a predetermined value or more. As shown in FIG. 7, when the touch panel 70 detects that the four points A3 to D3 have been pushed down, the outer peripheral distance of an area formed by the four points is calculated while always detecting (polling) the four push-down points. Then, whether or not the outer peripheral distance of the area formed by the four points is the predetermined value or more is detected. In the example of FIG. 7, when the outer peripheral distance of the area formed by the push-down points A4 to D4 reaches the predetermined value or more, the detection processing in the present step is ended.

The detection of a release operation is the opposite of the detection of a pinch operation, and when four push-down points have been detected in a pinch operation, four push-down points need to be detected in a release operation as well. The reason why the number of push-down points need to be consistent between a pinch operation and a release operation is to prevent false detection of any user operation performed between the pinch operation and the release operation. For instance, in a case where, after performing a pinch operation using four fingers and selecting a plurality of icons, the user expands the screen using two fingers in an operation to move the icons, detecting this operation as a release operation results in an operation unintended by the user.

In step S07, the selected icons are moved to a place (folder) where the release operation is performed. Then the processing is ended.

As described, a plurality of push-down points are detected on the touch panel, and icons are operated by the means of pinch and release operations. As a result, an information processing device comprising an intuitive and user-friendly interface can be provided. In particular, since an area formed by a plurality of push-down points can make a plurality of icons operation objects, an operation on a plurality of icons can be easily performed.

The touch panel 70 is used as the tactile contact detection unit in the description on the present exemplary embodiment, however, the tactile contract detection unit is not limited thereto. The tactile contact detection unit may be a detection device such as a tablet as long as it can detect a plurality of push-down points. This is common to all of the following exemplary embodiments.

[Second Exemplary Embodiment]

Figure 8:
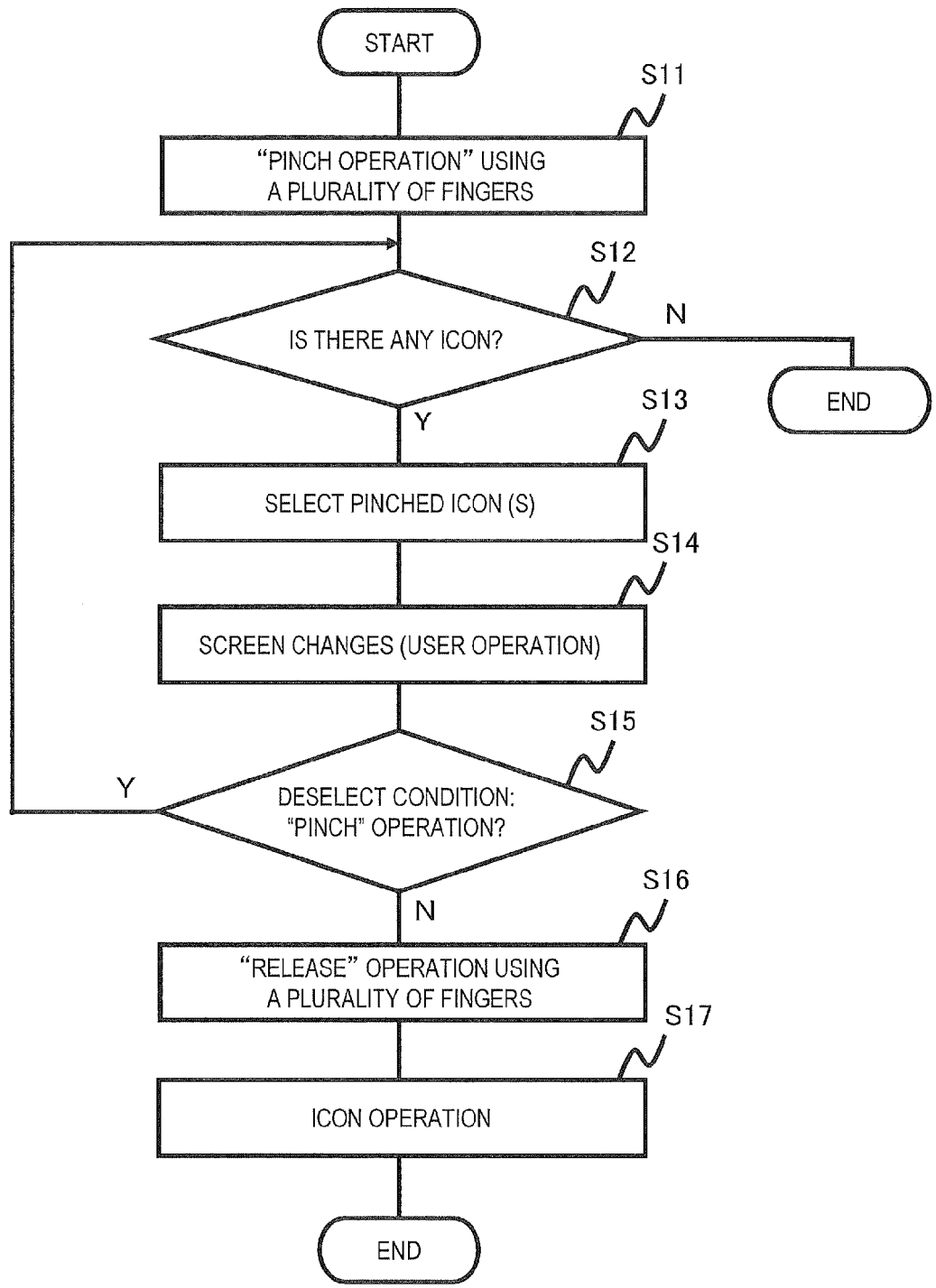
FIG. 8 is a flowchart explaining an operation of a control unit in a second exemplary embodiment.

Next, a second exemplary embodiment will be described in detail using FIG. 8. The configuration of an information processing device relating to the present exemplary embodiment is the same as that of the information processing device relating to the first exemplary embodiment. The information processing device relating to the present exemplary embodiment differs from the information processing device relating to the first exemplary embodiment in the control of the information processing device 1 performed by the control unit 10. FIG. 8 shows a flowchart of a touch panel operation in the present exemplary embodiment.

The difference between FIG. 4 and FIG. 8 is that the detection of a pinch operation is added as a deselect condition to the step S05 in FIG. 4, which confirms conditions for deselecting the icons. When a plurality of icons are selected and a pinch operation is detected while the user is performing an operation, the processing goes back to step S12 and reconfirms whether or not any icon exists. At this time, the initial selection of icons is cancelled. As described, the cancellation of the movement of icons and the selection of icons can be performed simultaneously by taking into consideration another pinch operation as a deselect condition.

[Third Exemplary Embodiment]

Next, a third exemplary embodiment will be described in detail. The configuration of an information processing device relating to the present exemplary embodiment is the same as that of the information processing device relating to the first exemplary embodiment. The information processing device relating to the present exemplary embodiment differs from the information processing device relating to the first exemplary embodiment in the control of the information processing device 1 performed by the control unit 10. In the first and the second exemplary embodiments, the method in which a plurality of icons are selected and the icons are moved using a release operation is described. In the present exemplary embodiment, the fact that a release operation can perform an operation other than moving icons is described.

When the plurality of icons selected in the step S01 in FIG. 4 are music files or video files and a release operation is performed on a player program used for playback of music or video files, the user may want to create a play list of the selected files. A play list is usually created by sequentially selecting candidate tracks using a dedicated program, however, a play list can be easily created by combining pinch and release operations.

Or the user may want to compress a plurality of files that have not been used for a predetermined period of time by "pinching" them. Further, a release operation performed on a compressed file may expand the compressed file. As described, a pinch operation may perform any processing, depending on the properties of the selected icons.

As described, by starting a software program installed in advance in a state in which a plurality of icons are selected, it becomes possible to determine a start-up mode of the software and a more user-friendly interface can be provided.

[Fourth Exemplary Embodiment]

Next, a fourth exemplary embodiment will be described in detail. The configuration of an information processing device relating to the present exemplary embodiment is the same as that of the information processing device relating to the first exemplary embodiment. The information processing device relating to the present exemplary embodiment differs from the information processing device relating to the first exemplary embodiment in the control of the information processing device 1 performed by the control unit 10.

In the first to the third exemplary embodiments, the cases where a plurality of icons are selected and operations are performed on the plurality of icons are described, however, in the present exemplary embodiment, pinch and release operations are used for operations other than icon selection.

When a pinch operation is performed with the information processing device 1 in any state and no icon exists within the selection area, this operation can trigger a backup of the information processing device 1 in the current state. Then, when a release operation is performed, backup content may be restored. For instance, the user may perform a pinch operation to create a backup before installing new software in the information processing device 1, and then install the software.

Or if no icon exists when a pinch operation is performed, the information processing device 1 may be locked with a security lock. In this case, robust security can be realized with simple operations if the information processing device is designed so that the security lock cannot be unlocked unless a release operation is performed at the place where the user put the security lock.

As described, even when no selection target icon exists at the time of a pinch operation and a first operation is not performed, by combining pinch and release operations, it becomes possible to execute a predetermined second operation and perform a third operation corresponding to the second operation by means of a release operation thereafter. As a result, an inherently complex operation can be easily executed.

Finally, preferred modes of the present invention are summarized.

[Mode 1]

(Refer to the Information Processing Device According to the First Aspect.)

[Mode 2]

The information processing device of Mode 1, wherein the control unit performs the second operation assessment when the tactile contact detection unit detects the same number of push-down points as that of the push-down points forming the first area in the second operation assessment.

[Mode 3]

The information processing device of Mode 1 or 2, wherein the display unit changes the color of the operation object when the operation object is in a selected state.

[Mode 4]

The information processing device of any one of Modes 1 to 3, wherein the control unit cancels the selected state according to a predetermined condition.

[Mode 5]

The information processing device of any one of Modes 1 to 4, wherein the control unit performs the first operation on a plurality of the operation objects overlapping the first area.

[Mode 6]

The information processing device of any one of Modes 1 to 5, wherein the first operation moves the operation object to the place where the second operation assessment has been performed.

[Mode 7]

The information processing device of any one of Modes 1 to 6, wherein the control unit determines a start-up mode of a software program installed in advance by starting the software program in the selected state.

[Mode 8]

The information processing device of any one of Modes 1 to 7, wherein the control unit performs a predetermined second operation when there is no overlapping part between the operation object and the first area after the first operation assessment, and performs a third operation corresponding to the second operation when the second operation assessment is performed.

[Mode 9]

(Refer to the Control Method for an Information Processing Device According to the Second Aspect.)

[Mode 10]

The information processing device control method of Mode 9, wherein the second operation assessment step is performed when the tactile contact detection unit detects the same number of push-down points as that of the push-down points forming the first area.

[Mode 11]

The information processing device control method of Mode 9 or 10 including a step of having the display unit change the color of the operation object when the operation object is selected.

[Mode 12]

The information processing device control method of any one of Modes 9 to 11 including a step of canceling the selected state according to a predetermined condition.

[Mode 13]

The information processing device control method of any one of Modes 9 to 12, wherein a plurality of the operation objects overlapping the first area are selected in the step of selecting the operation objects.

[Mode 14]

The information processing device control method of any one of Modes 9 to 13, wherein the first operation moves the operation object to the place where the second operation assessment step has been performed.

[Mode 15]

The information processing device control method of any one of Modes 9 to 14 including a step of determining a start-up mode of a software program installed in advance by starting the software program in a state in which the operation object is selected.

[Mode 16]

The information processing device control method of any one of Modes 9 to 15 including a step of performing a predetermined second operation when there is no overlapping part between the operation object and the first area, and performing a third operation corresponding to the second operation when the second operation assessment is performed.

[Mode 17]

(Refer to the Program According to the Third Aspect.)

[Mode 18]

The program of Mode 17, wherein the second operation assessment process is executed when the tactile contact detection unit detects the same number of push-down points as that of the push-down points forming the first area.

[Mode 19]

The program of Mode 17 or 18 executing a process of having the display unit change the color of the operation object when the operation object is selected.

[Mode 20]

The program of any one of Modes 17 to 19 executing a process of canceling the selected state according to a predetermined condition.

[Mode 21]

The program of any one of Modes 17 to 20, wherein a plurality of the operation objects overlapping the first area are selected in the process of selecting the operation objects.

[Mode 22]

The program of any one of Modes 17 to 21, wherein the first operation moves the operation object to the place where the second operation assessment process has been performed.

[Mode 23]

The program of any one of Modes 17 to 22 executing a process of determining a start-up mode of a software program installed in advance by starting the software program in a state in which the operation object is selected.

[Mode 24]

The program of any one of Modes 17 to 23 executing a process of performing a predetermined second operation when there is no overlapping part between the operation object and the first area, and performing a third operation corresponding to the second operation when the second operation assessment is performed.

It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications aforementioned. Particularly, any numerical range disclosed herein should be interpreted that any intermediate values or subranges falling within the disclosed range are also concretely disclosed even without specific recital thereof. For instance, after selecting a plurality of icons, the user may be able to delete the selected icons by performing a release operation over a trash icon.

REFERENCE SIGNS LIST

1: information processing device
10: control unit
20: storage device
30: memory
40: input device
50: display unit
60: power supply unit
70: touch panel

The invention claimed is:

1. An information processing device, comprising:
a display unit that displays a device's operation object;
a tactile contact detection unit that detects a plurality of push-down points; and
a control unit that:
puts said device's operation object in a selected state when there is an overlapping part between said device's operation object and an area formed by connecting adjacent push-down points among said plurality of push-down points detected by said tactile contact detection unit when a user's pinch operation is detected;
performs a user's operation assessment for detecting a user's release operation;
determines whether a number of push-down points when said user's release operation is detected and a number of push-down points when said device's operation object is put in the selected state are equal;
performs a first device's operation in a case where said number of push-down points when said user's release operation is detected and said number of push-down points when said device's operation object is put in the selected state are equal; and
performs a second device's operation in a case where said number of push-down points when said user's release operation is detected and said number of push-down points when said device's operation object is put in the selected state are different.

2. The information processing device according to claim 1, wherein said display unit changes a color of said device's operation object when said device's operation object is in said selected state.

3. The information processing device according to claim 1, wherein said control unit cancels said selected state according to a predetermined condition.

4. The information processing device according to claim 1, wherein said control unit performs said first device's operation on a plurality of said device's operation objects overlapping said area.

5. The information processing device according to claim 1, wherein said first device's operation is moving said device's operation object to a place where said user's operation assessment has been performed.

6. The information processing device according to claim 1, wherein said control unit determines a start-up mode of a software program installed in advance by starting said software program in said selected state.

7. The information processing device according to claim 1, wherein said control unit:
performs a third device's operation when there is no overlapping part between said device's operation object and said area; and
performs a fourth device's operation corresponding to said third device's operation when said user's operation assessment is performed.

8. The information processing device according to claim 1, wherein the determination of movement of push-down point includes determination that the push-down points spread outward.

9. A control method for an information processing device comprising:
a display unit that displays a device's operation object; and
a tactile contact detection unit that detects a plurality of push-down points, said control method including:
putting said device's operation object in a selected state when there is an overlapping part between said device's operation object and an area formed by connecting adjacent push-down points among said plurality of push-down points detected by said tactile contact detection unit when a user's pinch operation is detected;
performing a user's operation assessment that detects a user's release operation;
determining whether a number of push-down points when said user's release operation is detected and a number of push-down points when said device's operation object is put in the selected state are equal;
performing a first device's operation in a case where said number of push-down points when said user's release operation is detected and said number of push-down points when said device's operation object is put in the selected state are equal; and
performing a second device's operation in a case where said number of push-down points when said user's release operation is detected and said number of push-down points when said device's operation object is put in the selected state are different.

10. The control method for an information processing device according to claim 9, further including having the display unit change a color of the device's operation object when the device's operation object is selected.

11. The control method for an information processing device according to claim 9, further including canceling the selected state according to a predetermined condition.

12. The control method for an information processing device according to claim 9, wherein a plurality of the device's operation objects overlapping the area are selected in the step of selecting the device's operation objects.

13. The control method for an information processing device according to claim 9, wherein the first device's operation is moving the device's operation object to a place where the user's operation assessment step has been performed.

14. The control method for an information processing device according to claim 9, further including determining a start-up mode of a software program installed in advance by starting the software program in a state in which the device's operation object is selected.

15. The control method for an information processing device according to claim 9, further including:
performing a third device's operation when there is no overlapping part between the device's operation object and the area, and
performing a fourth device's operation corresponding to the third device's operation when the user's operation assessment is performed.

16. A computer readable non-transitory medium storing a program executed by a computer that includes an information processing device comprising:
a display unit that displays a device's operation object; and
a tactile contact detection unit that detects a plurality of push-down points, said program having said computer execute:
putting said device's operation object in a selected state when there is an overlapping part between said device's operation object and an area formed by connecting adjacent push-down points among said plurality of push-down points detected by said tactile contact detection unit when a user's pinch operation is detected;
performing a user's operation assessment that detects a user's release operation;
determining whether a number of push-down points when said user's release operation is detected and a number of push-down points which are detected when said device's operation object is put in the selected state are equal;
performing a first device's operation in a case where said number of push-down points when said user's release operation is detected and said number of push-down points when said device's operation object is put in the selected state are equal; and
performing a second device's operation in a case where said number of push-down points when said user's release operation is detected and said number of push-down points when said device's operation object is put in the selected state are different.

17. The medium according to claim 16, wherein the program further has said computer execute a process of having the display unit change a color of the device's operation object when the device's operation object is selected.

18. The medium according to claim 16, wherein the program further has said computer execute a process of canceling the selected state according to a predetermined condition.

* * * * *